United States Patent

[11] 3,601,360

[72] Inventor  Domer Scaramucci
    3245 S. Hattie, Oklahoma City, Okla. 73129
[21] Appl. No. 848,414
[22] Filed Aug. 6, 1969
[45] Patented Aug. 24, 1971

[54] DISC VALVE ASSEMBLY WITH TILT IN VALVE MEMBER
    15 Claims, 6 Drawing Figs.

[52] U.S. Cl. ............................................. 251/304, 251/151
[51] Int. Cl. ............................................. F16k 1/20
[50] Field of Search ............................................. 251/308, 304, 305, 306, 308, 172, 315, 317, 298, 151; 137/454.2

[56] References Cited
UNITED STATES PATENTS

| 3,531,075 | 9/1970 | Kitazawa | 251/306 |
| 2,740,423 | 4/1956 | Stillwagon | 251/306 X |
| 2,882,010 | 4/1959 | Bryant | 251/306 |
| 3,068,887 | 12/1962 | Grove | 251/315 X |
| 3,081,791 | 3/1963 | Wheatley | 251/308 X |
| 3,306,316 | 2/1967 | Stillwagon | 251/306 X |
| 3,341,170 | 9/1967 | Housworth | 251/306 |
| 3,384,340 | 5/1968 | Fawkes | 251/307 |
| 3,460,802 | 8/1969 | Colby et al. | 251/172 |
| 3,290,001 | 12/1966 | Taylor | 251/306 X |

FOREIGN PATENTS

| 1,157,044 | 11/1963 | Germany | 251/304 |
| 753,104 | 7/1956 | Great Britain | 251/308 |

Primary Examiner—M. Cary Nelson
Assistant Examiner—R. B. Rothman
Attorney—Dunlap, Laney, Hessin & Dougherty ABSTRACT: A disc valve assembly having valve stems adapted to cooperate with the disc valve member and the valve body, such that the disc valve member is installed by being tilted and inserted axially into the valve body, and wherein the seat is also inserted axially in the valve body.

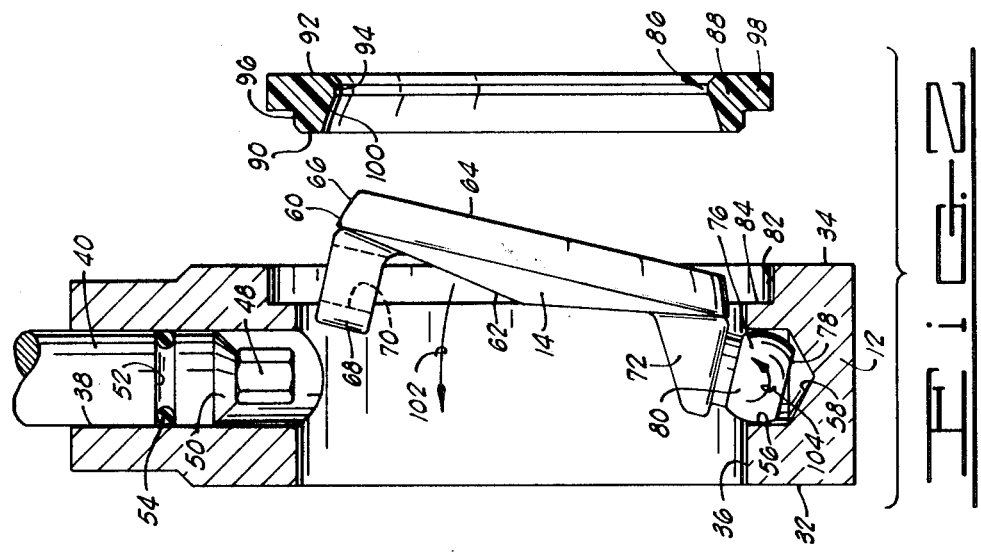
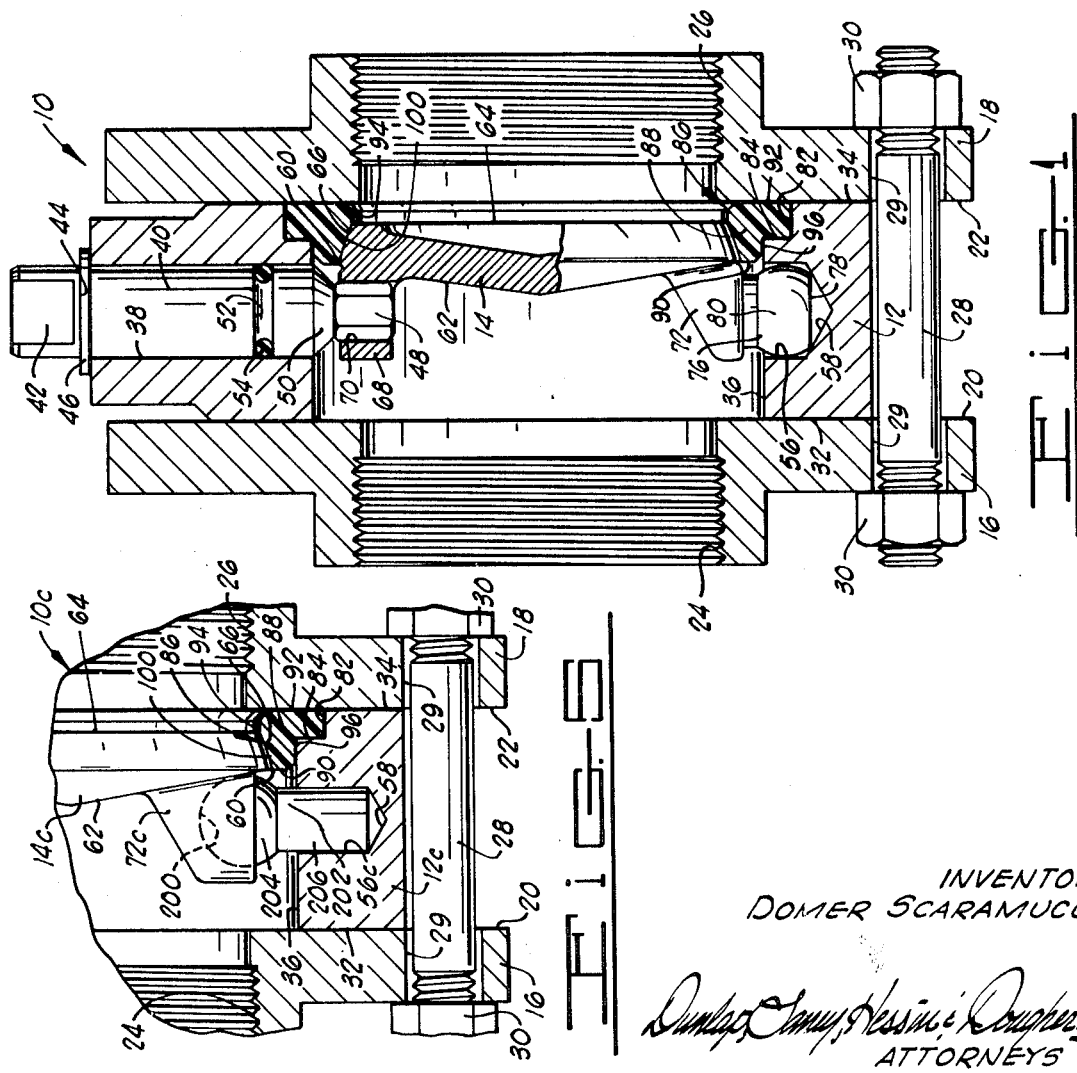

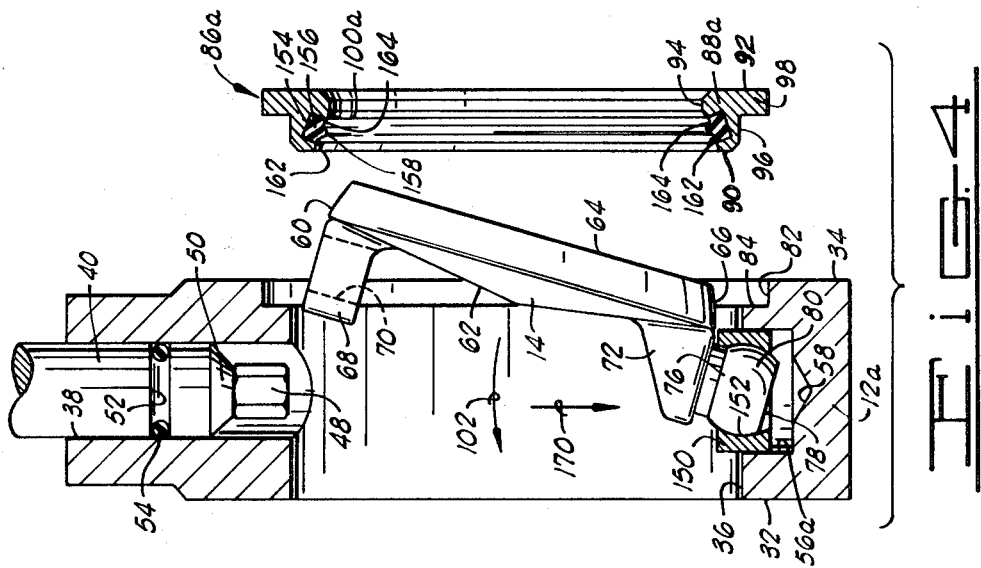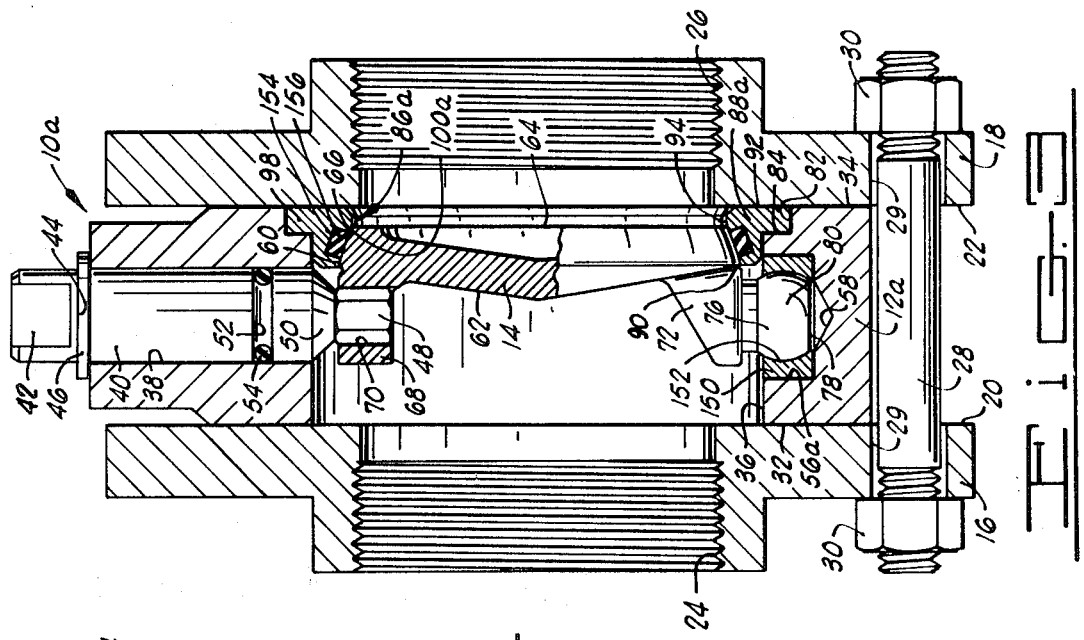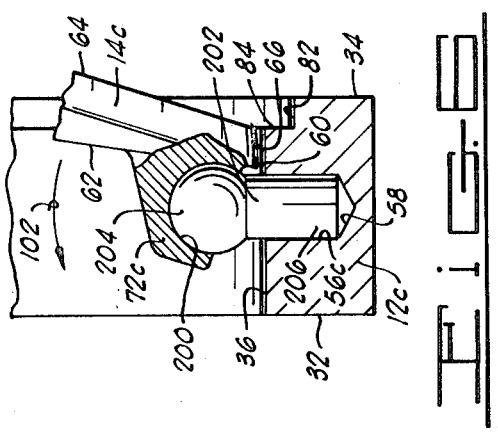

DISC VALVE ASSEMBLY WITH TILT IN VALVE MEMBER

BACKGROUND OF THE INVENTION

1. Field of the Invention

This invention relates generally to improvements in valves, and more particularly, but not by way of limitation, to an improved disc valve assembly having an insertable disc valve member and seats.

2. Description of the Prior Art

In what may be considered the usual disc valve construction, the disc is secured to upper and lower valve stems by screws or bolts, and the stems are journaled in the valve body. In this type of construction, the procedure for connecting the valve stems to the disc generally requires working from both ends of the valve body simultaneously. The disc has to be held in position from one end of the valve body while connecting the valve stems to the disc from the opposite end of the valve body. The result in many instances was a loose connection between the valve stems and the disc valve member, thereby resulting in a misalignment between the disc valve member and the seats.

It should also be noted that the procedure described generally above not only required additional assembly time during the manufacture of the valve, but also required additional time during any disassembly of the valve, or, in other words, additional downtime during the field repair of the valve.

SUMMARY OF THE INVENTION

The present invention contemplates a valve assembly which basically includes a valve body having opposite end faces and a bore extending therethrough. A disc valve member is rotatably disposed in the bore of the valve body, and has opposite end faces and a seating surface formed about the outer periphery thereof, generally between the opposite end faces. A first valve stem, having an upper end and a lower end, is journaled in the valve body and extends generally at a right angle to the bore in the valve body. The lower end of the first valve stem is adapted to be removably connected to the upper portion of the disc valve member for turning the disc valve member from a fully open to a fully closed position. The valve assembly also includes a second valve stem means which is adapted to journally support the disc valve member in the valve body at a lower portion of the disc valve member and includes a ball and socket connection, such that the disc valve member can be tiltingly inserted axially into position in the valve body. A seat is disposed in the valve body and has a seating surface formed thereon sized and positioned to seatingly and sealingly engage the seating surface of the disc valve member, in one position of the disc valve member.

An object of the invention is to facilitate the repair of valve assemblies in the field.

Another object of the invention is to provide a disc valve assembly having an insertable disc valve member and seats, thereby reducing the amount of time required to assemble or disassemble the valve.

A further object of the invention is to provide a disc valve assembly wherein the disc valve member is axially insertable in the valve body in a manner which assures positive location of the disc valve member in the valve body and also assures the integrity of the connection between the valve stem and the disc valve member.

A still further object of the invention is to provide a valve assembly which can be quickly, easily and economically manufactured.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a sectional view of a valve assembly, assembled between flanges.

FIG. 2 is an exploded view of the valve assembly of FIG. 1.

FIG. 3 is a view similar to FIG. 1, but illustrating a modified valve assembly.

FIG. 4 is an exploded view of the valve assembly of FIG. 3.

FIG. 5 is a fragmentary, sectional view of a portion of another modified valve assembly.

FIG. 6 is a fragmentary view of the modified valve assembly of FIG. 5, but showing the disc valve member and the seat assembly removed from an assembled position in the valve body.

DESCRIPTION OF THE PREFERRED EMBODIMENT

Referring to the drawings in detail, and to FIGS. 1 and 2 in particular, shown therein and designated by the general reference character 10, is a valve assembly basically comprising a valve body 12, having a disc valve member 14 rotatably disposed therein.

The valve assembly 10, as shown in FIG. 1, is disposed generally between a pair of flanges 16 and 18, respectively. Each of the flanges 16 and 18 includes an end face 20 or 22, and a threaded opening 24 or 26, respectively. The threaded openings 24 and 26 are axially aligned and sized to receive the threaded ends of adjacent sections of a conduit (not shown).

The valve body 12 and the flanges 16 and 18 are held in an assembled relationship by a plurality of threaded bolts 28 that extend through apertures 29 in the flanges 16 and 18, and about the outer periphery of the valve body 12. Each of the bolts 28 is provided with a pair of threaded nuts 30 which engage the flanges 16 and 18.

The valve body 12 is basically tubular shaped and has opposite end faces 32 and 34, and a bore 36 extending therethrough, intersecting the end faces 32 and 34. An aperture 38 extends transversely through the valve body 12, intersecting the bore 36 therein.

A first valve stem 40 is journaled in the valve body 12 and extends through the transversely extending aperture 38. Thus, the center line of the first valve stem 40 extends generally at a right angle to the centerline of the bore 36 in the valve body 12.

The upper portion 42 of the first valve stem 40 is adapted to receive and cooperate with a valve handle, or other appropriate operator (not shown), for turning the first valve stem 40 and thereby rotating the disc valve member 14 from a fully open to a fully closed position, in a manner which will be described more fully below. Various forms of valve handles and valve operators are well known in the art and no further description is required herein.

A groove 44 is formed in the upper portion 42 of the first valve stem 40, and a retaining ring 46 is disposed in the groove 44 to limit the downward movement of the first valve stem 40 in the aperture 38. A hexagonally shaped end 48 is formed on a lowermost end portion 50 of the first valve stem 40, for reasons which will be made more apparent below.

A second annular groove 52 is formed in the first valve stem 40 generally between the upper portion 42 and the lowermost end portion 50 thereof. An O-ring seal member 54 is disposed in the groove 52. The O-ring seal member 54 is sized to sealingly engage the walls of the valve body 12 formed by the aperture 38 and the first valve stem 40, thereby providing a fluidtight seal therebetween.

A recess or socket 56, having a generally circular-shaped cross section, is formed in one side of the bore 36 of the valve body 12. The recess 56 extends a distance transversely into the valve body 12, and terminates with a conical-shaped end portion 58. The recess 56 is, in a preferred form, radially aligned with the aperture 38 in the valve body 12, for reasons which will be made more apparent hereinbelow.

The disc valve member 14 is rotatably disposed in the bore 36 of the valve body 12, and is preferably constructed of a relatively rigid material. The disc valve member 14 is generally circular shaped, having an outer periphery 60 and opposite end faces 62 and 64. A seating surface 66 is formed on the outer periphery 60 generally between the opposite end faces 62 and 64.

An upper flange 68 is formed on the end face 62 of the disc valve member 14 and extends a distance axially therefrom. The upper flange 68 is disposed generally near the outer periphery 60 of the disc valve member 14 at an upper portion thereof and includes an aperture 70 extending transversely therethrough. The aperture 70 is disposed such that in an assembled position, as shown in FIG. 1, the aperture 70 is aligned with the aperture 38 in the valve body 12, and the aperture 70 is sized and shaped to matingly receive the hexagonal-shaped end portion 48 of the first valve stem 40, thereby providing the interconnection therebetween.

A lower flange 72 is formed on the end face 62 of the disc valve member 14, and extends a distance axially therefrom. The lower flange 72 is disposed generally near the outer periphery 60 of the disc valve member 14, at a lower portion thereof. A second valve stem 76 is formed on the flange 72, and extends in a downward direction generally radially therefrom, terminating with a lower end 78. A portion 80 of the second valve stem 78 is spherically shaped in the form of a partial ball and sized to rotatingly fit in the recess 56 of the valve body 12, in a manner to be more fully described below.

A counterbore 82 is formed in the valve body 12, thereby providing an annular wall 84 therein facing the end 34 of the valve body. The counterbore 82 and the annular wall 84 are provided to receive and cooperate with a seat assembly 86.

The seat assembly 86 basically comprises a seat ring 88 having a valve member end 90, a nonvalve member end 92, and inner and outer peripheries 94 and 96, respectively. The seat ring 88 is preferably constructed of a metal or reinforced plastic material.

A flange portion 98 is formed on the outer periphery 96 of the seat ring 88, generally adjacent the nonvalve member end 92 thereof. The flange portion 98 extends generally radially from the seat ring 88, and is sized to slidingly fit in the counterbore 82 of the valve body 12. A seating surface 100 is formed on the inner periphery 94 of the seat ring 88, generally between the valve member end 90 and the nonvalve member end 92 thereof. The seating surface 100 is sized to sealingly and seatingly engage the seating surface 66 of the disc valve member 14, when the disc valve member 14 is rotated to the closed position, as shown in FIG. 1.

As shown more clearly in Fig. 1, the disc valve member 14 is supported in the valve body 12, such that the seating surface 66 of the disc valve member 14 is axially offset from the turning axis of the valve assembly 10. This particular construction has been found desirable, particularly in high pressure applications due to the improved seating characteristics thereof.

OPERATION OF FIGS. 1 AND 2

The disc valve member 14, and more particularly the connection between first valve stem 40 and the disc valve member 14 and cooperation between the second valve stem 76 and the valve body 12 are such that the disc valve member 14 can be tiltingly inserted axially into the valve body 12.

The disc valve member 14, as shown in FIG. 2, is tilted at an angle of approximately 30° from a vertical plane, and in that position, inserted axially into the valve body 12, to a position wherein the ball portion 80 of the second valve stem 76 is partially disposed in the recess or socket 56 of the valve body 12. The disc valve member 14 is then tilted in toward a vertical plane as indicated by the arrow 102 to a position wherein the aperture 70 in the upper flange 68 is aligned with the aperture 38 in the valve body 12.

As the disc valve member 14 is moved in the direction 102, the second valve stem 76 will be rotated in a general direction 104 following the rotational movement of the disc valve member 14, and simultaneously moved downwardly in the recess 56 of the valve body 12, to the assembled position as shown in FIG. 1. In the assembled position of the second valve stem 76, a portion of the spherically shaped outer periphery 80 thereof will engage the wall formed in the body 12 by the recess 56, and a portion of the end 78 of the second valve stem 76, generally adjacent the spherically shaped outer periphery 80 thereof, will engage the conical shaped portion 58 of the recess 56. It is apparent from the foregoing that the spherical shape of the outer periphery of the second valve stem 76 cooperates with the circular shaped recess 56 in the valve body 12 to permit the disc valve member 14 to be tiltingly inserted in an axial direction in the valve body 12.

The first valve stem 40 is then inserted downwardly through the aperture 38 to a position wherein the hexagonally shaped end portion 48 thereof is interconnectingly disposed in the recess 70 of the flange 68. Due to this interconnection between the first valve stem 40 and the disc valve member 14, when the valve handle (not shown) is turned, thereby rotating the first valve stem 40, the rotating motion is transmitted to the disc valve member 14. The disc valve member 14 may thus be rotated from an open position, that is, a position wherein the disc valve member 14 is in line with the bore 36 in the valve body 12, to a closed position, that is, a position wherein the disc valve member 14 is transverse to the axis of the bore 36 in the valve body 12.

Since only a portion of the end 78 of the second valve stem 76 contacts the valve body 12, it is apparent that the conical-shaped portion 58 of the recess 56 cooperates with the flat end 78 of the second valve stem 76 to substantially reduce a contacting area therebetween. This reduction in contact area between the second valve stem 76 and the valve body 12 reduces the frictional resistance to the turning motion of the first valve stem 40. It should also be noted that the conical-shaped portion 58 in the valve body 12 provides a space in which foreign particles may be deposited, rather than permitting same to be lodged between the second valve stem 76 and the valve body 12, thereby resulting in a premature wearing therebetween.

The seat assembly 86 is then inserted axially in the valve body 12. In this assembled position as shown in FIG. 1, the seating surface 100 of the seat ring 88 will seatingly and sealingly engage the seating surface 66 of the disc valve member 14, when the disc valve member 14 is rotated to the closed position, thereby forming a fluidtight seal therebetween. The flanges 16 and 18 will cooperate with the valve body 12 to secure the seat assembly 86 in the assembled position.

Due to the manner in which the disc valve member 14 is tiltingly inserted axially in the valve body 12, the diameter of the bore 36 in the valve body 12 can be reduced to a minimum. Thus, the valve assembly 10 provides an insertable disc valve member 14, and yet maintains the size of the valve body at a minimum, thereby reducing the cost of manufacture and facilitating the field repair of the valve assembly. The valve assembly 10 also provides an insertable disc valve member wherein, not only is the alignment between the valve stems and the disc valve member assured, but also the positive interconnection between the valve stems and the disc valve member is assured.

It is apparent from the foregoing that the valve assembly 10 provides a valve which can be quickly and easily assembled and disassembled, thereby facilitating the manufacture and field repair of the valve assembly 10. Further, since the disc valve member 14 and the seat assembly 86 are both insertable axially via the same end of the valve body 12, both components could be removed from the valve body 12 by simply removing one flange, thereby reducing the time required during field repair of the valve assembly.

EMBODIMENT OF FIGS. 3 AND 4

The modified valve assembly 10a, shown in Figs. 3 and 4, is constructed in the same manner as the valve assembly 10, except as described below.

A bearing ring 150, having an aperture 152 therethrough, is disposed about the spherically shaped second valve stem 76. The aperture 152 is also spherically shaped to form a socket and journally engage the ball portion 80 of the second valve stem about the outer periphery thereof. The bearing ring 150 may be constructed of a plastic, or of a metal, and may be split into two separate components to facilitate the assembly thereof about the second valve stem 76.

The recess 56a in the valve body 12a is sized to slidingly receive the bearing ring 150 and cooperate therewith to journally support the second valve stem 76. In a preferred form, the bearing ring 150, and therefore, the recess 56a, are noncircular shaped in one cross section thereof.

The seat assembly 86a is constructed similar to the seat assembly 86, shown in FIGS. 1 and 2, except an annular groove 154 is formed in the seating surface 100a of the seat ring 88a, and an elastomeric seal member 156 is disposed in the groove 154. In a preferred form the seal member 156 is bonded in the groove 154.

As shown more clearly in FIG. 4, an annular bead 158 is formed on the seal member 156 and extends a distance radially therefrom beyond the seating surface 100a. The annular bead 158 is sized to sealingly engage the seating surface 66 of the disc valve member 14 when the disc valve member 14 is rotated to the closed position. Annular grooves 162 and 164 are formed in the seal member 156 on opposite sides of the annular bead 158. It should also be noted that since the seat ring 88a, shown in FIGS. 3 and 4, carries an elastomeric seal member 156, the seat ring 88a can be constructed of a metal or reinforced plastic.

OPERATION OF FIGS. 3 AND 4

The disc valve assembly 10a will operate substantially the same as the disc valve assembly 10, in that the disc valve member 14 is tiltingly insertable axially in the valve body 12a and the seat assembly 100a is also axially insertable in the valve body 12a.

The disc valve member 14 is tilted to an angle of approximately 30° to a vertical plane as shown in FIG. 4, and positioned such that the bearing ring 150 is above the recess 56a. The disc valve member 14 is then tilted in the direction 102, and simultaneously moved downward in a direction 170 so that the bearing ring 150 is slidingly inserted in the recess 56a. As the disc valve member 14 is tilted in the direction 102, the second valve stem 76 will rotate in the mating aperture 152 of the bearing ring 150 until the disc valve member 14 has been moved to the assembled position, as shown in FIG. 4.

In the assembled position the first valve stem 40 is interconnected to the disc valve member 14 in the same manner as described before. The seat assembly 86a is also axially inserted in the valve body 12a, in the manner exactly like that described with respect to the seat assembly 86.

As the disc valve member 14 is turned, the second valve stem 76 will turn in the bearing ring 150. Since, in a preferred form, the recess 58a is noncircular in shape, the bearing ring 150 will not rotate in the recess 56a, and therefore a minimum amount of wearing will occur therebetween.

When the disc valve member 14 is rotated to the closed position, the annular bead 158 of the seat assembly 86a will be compressed against the seating surface 66 of the disc valve member 14. The recesses 162 and 164, which are disposed on opposite sides of the annular bead 158, cooperate with the annular bead 158 to enable the seal member 156 to provide a pressure responsive type seal, regardless of whether the end face 62 or the end face 64 of the disc valve member 14 is exposed to the upstream pressure in the valve assembly 10a. Thus, the seal member 156 provides what may be referred to as a two-way type of seal.

It is apparent from the foregoing that the valve assembly 10a retains all of the advantages of the valve assembly 10, and in addition provides a valve wherein the portion thereof journally engaging the second valve stem, that is, the bearing ring 150, is replaceable. Thus, when substantial wearing occurs between the second valve stem 76 and the bearing ring 150, the bearing ring 150 can simply be replaced, thereby eliminating the necessity of replacing an entire valve body.

EMBODIMENT OF FIGS. 5 AND 6

Shown in FIGS. 5 and 6 is a modified second valve stem connection which may be used in a valve assembly in accordance with the invention. Only those portions of the valve assembly 10c necessary to describe the above mentioned modification are shown in FIGS. 5 and 6, it being understood that the remaining portions of the valve assembly 10c are constructed exactly like those previously described with respect to the valve assembly 10, shown in FIGS. 1 and 2.

A valve stem is not formed on the flange 72c similar to the second valve stem 76, shown in FIGS. 1 and 2, but, rather, a partial spherically shaped recess or socket 200 is formed in the lower end of the flange 72c. The recess 200 is sized to rotatingly receive a portion of a second valve stem 202 which is disposed in the valve body 12c.

The second valve stem 202 has upper and lower end portions 204 and 206, respectively. The lower end portion 206 is, in a preferred form, cylindrically shaped and sized to slidingly fit in a modified recess 56c of the valve body 12c. It should be noted that the lower end portion 206 and the recess 56c could be provided with a noncircular shape, thereby eliminating rotation therebetween, similar to the valve assembly 10a, shown in FIGS. 3 and 4.

The upper portion 204 of the second valve stem 202 is spherically shaped in the form of a partial ball and sized to fit in the recess 200. The spherically shaped upper end portion 204 and the recess 200 are sized to cooperate to rotatingly support disc valve member 14c in the bore of the valve body 12c. In an assembled position as shown in FIG. 5, the recess 200 encompasses a sufficient area of the upper end portion 204 so that the rotating engagement between the disc valve member 14 and the second valve stem 202 is maintained during the operation of the valve assembly 10c.

OPERATION OF FIGS. 5 AND 6

The valve assembly 10c, partially shown in FIGS. 5 and 6, will operate substantially the same as valve assembly 10, shown in FIGS. 1 and 2, in that the disc valve member 14c is adapted to cooperate with the second valve stem so that the disc valve member 14c can be tiltingly inserted axially in the valve body 12c. It should also be noted that the valve assembly 10c includes the same seat assembly 86, as shown in FIGS. 1 and 2, and the seat assembly 86 will cooperate with the disc valve member 14c to provide a fluidtight seal therebetween in a manner exactly like that described with respect to the valve member 10.

The lower end portion 206 of the second valve stem 202 is inserted downwardly into the recess 56c in the valve body 12c. The disc valve member 14c is then inserted axially in the valve body 12c in a tilted position, such that the disc valve member 14c is at an angle of approximately 30° with respect to a vertical plane. With the disc valve member 14c in that position, the recess 200 in the flange 72c will engage the upper end portion 204 of the second valve stem 200, as shown in FIG. 6. The disc valve member 14c is then tilted in a direction 102 to the assembled position, shown in FIG. 5.

The first valve stem 40 is interconnected to the disc valve member 14c exactly like that described with respect to the valve assembly 10, shown in FIGS. 1 and 2. The disc valve member 14c can thus be rotated from a fully open to a fully closed position. As the disc valve member 14c is rotated, the second valve stem 202 will rotatingly engage the recess 200 in the flange 72c of the disc valve member 14c, thereby rotatingly supporting the disc valve member 14c in the valve body 12c.

It is apparent from the foregoing that the valve assembly 14c retains most of the advantages of the valve assembly 10 described heretofore, and in addition shows a slightly modified interconnection between the second valve stem and the valve body, which may be preferred in some applications.

It is also apparent from the foregoing that the valve assemblies described herein provide a disc valve member which cooperates with the valve bodies and the valve stem connections, such that the disc valve member can be tiltingly inserted axially into the respective valve body. This tilting insertion of the disc valve member not only provides a valve assembly which can be assembled and disassembled in a quicker and easier manner, but also provides a valve assembly wherein the disc valve member is journaled in upper and lower portions thereof in a manner which insures proper alignment and a proper interconnection between the disc valve member and the valve stems. Thus the valve assemblies described herein are constructed so as to reduce the manufacturing cost thereof, and constructed such that they may be repaired in the field in a manner requiring less down time.

Changes may be made in the construction of the parts or elements of the various embodiments as disclosed herein without departing from the spirit and scope of the invention.

What is claimed is:

1. A valve assembly, comprising:
    a valve body having opposite end faces and a bore extending therethrough;
    a disc valve member in the bore of the valve body having opposite end faces and a seating surface formed about the outer periphery thereof between the opposite end faces, said disc valve member having upper and lower diametrically opposed flanges projecting from one end face thereof, the diameter of the disc valve member and the distance between the upper end of the upper flange and the lower end of the lower flange being sufficiently less than the diameter of the valve body bore that the disc valve member may be tilted from a nonvertical to a vertical plane into operating position in the valve body bore;
    a first valve stem having an upper end and a lower end and being journaled in the valve body to extend at a right angle to the bore in the valve body, the lower end of the first valve stem being adapted to be removably connected to the upper flange of the disc valve member for turning the disc valve member from a fully open to a fully closed position;
    second valve stem means journally supporting the lower flange of the disc valve member in the valve body, said second valve stem means including a ball and socket connection whereby the disc valve member may be inserted in the valve body bore at an angle to the vertical and tilted into position for connection of the first valve stem to the upper flange thereof; and
    seat means disposed in the bore of the valve body having a seating surface thereon sized and positioned to seatingly and sealingly engage the seating surface of the disc valve member in one position of the disc valve member.

2. The valve assembly of claim 1 wherein the upper flange has an aperture of noncircular shaped cross section, extending therethrough and wherein the lower end portion of the first valve stem is sized and shaped to matingly and interconnectingly extend through said aperture in the flange.

3. The valve assembly of claim 1 wherein the second valve stem means is defined further to include, a spherically shaped stem connected to the lower flange of the disc valve member and extending a distance radially therefrom, beyond the outer periphery of the disc valve member; and wherein the valve body includes a recess intersecting the bore therein, said recess being sized and positioned to receive the spherically shaped stem and to cooperate therewith.

4. The valve assembly of claim 3 wherein the spherically shaped stem includes a flat portion formed on the radially outer end thereof; and wherein the recess in the valve body includes a conical-shaped end portion sized and shaped to cooperate with the flat portion of the spherically shaped stem to reduce the contacting area between the spherically shaped stem and the valve body.

5. The valve assembly of claim 3 wherein the spherically shaped stem is formed integrally with the lower flange of the disc valve member.

6. The valve assembly of claim 1 wherein the second valve stem means is defined further to include:
    a spherically shaped stem connected to the lower flange of the disc valve member and extending a distance radially therefrom beyond the outer periphery of the disc valve member; and
    a bearing ring, having an outer periphery and an aperture extending therethrough, said aperture being sized to rotatingly and bearingly receive a portion of the spherically shaped stem.

7. The valve assembly of claim 6 wherein the valve body includes:
    a recess intersecting the bore therein, said recess being sized and positioned to slidingly receive the outer periphery of the bearing ring and to cooperate therewith such that as the disc valve member is tiltingly inserted axially into the valve body, the bearing ring is inserted in the recess in the valve body.

8. The valve assembly of claim 7 wherein the outer periphery of the bearing ring is circular shaped.

9. The valve assembly of claim 7 wherein the outer periphery of the bearing ring is noncircular shaped.

10. The valve assembly of claim 1 wherein the lower flange has a spherically shaped recess formed in the lower end thereof; and
    the second valve stem means comprises a pin having an upper end and a lower end, said upper end being spherically shaped and sized to at least partially enter the recess in the flange portion, and to cooperate therewith in supporting the disc valve member.

11. The valve assembly of claim 10 wherein the valve body includes a recess intersecting the bore therein, said recess being sized and positioned to receive the lower end portion of the pin.

12. The valve assembly of claim 11 wherein the lower end portion of the pin has a noncircular-shaped cross section.

13. The valve assembly of claim 11 wherein the lower end portion of the pin has a circularly shaped cross section.

14. The valve assembly of claim 1 wherein the valve body includes a counterbore intersecting one end face thereof, said counterbore being sized to axially receive and to cooperate with the seat means; and wherein the seat means is defined further to include, a seat ring of a relatively inflexible material, having a seating surface formed thereon, said seat ring being sized to slidingly fit in said counterbore in the valve body.

15. The valve assembly of claim 14 wherein the seat means is defined further to include:
    an elastomeric seal member disposed in the seating surface thereof, said seal member having a portion thereof extending beyond the seating surface of the seat ring, and a pair of grooves in the seal member, said grooves being disposed on opposite sides of the extending portion of the seal member, such that the seal member is pressure responsive in two directions.